Jan. 6, 1970          H. GROSS          3,488,577

ASYMMETRIC ORTHOGONAL COIL SUSCEPTIBILITY METER

Filed Sept. 1, 1967          3 Sheets-Sheet 1

INVENTOR
HARRY GROSS

ATTORNEYS

United States Patent Office 3,488,577
Patented Jan. 6, 1970

3,488,577
ASYMMETRIC ORTHOGONAL COIL SUSCEPTIBILITY METER
Harry Gross, Ottawa, Ontario, Canada, assignor to Canadian Patents and Development Limited, Ottawa, Ontario, Canada, a corporation of Canada
Filed Sept. 1, 1967, Ser. No. 665,006
Int. Cl. G01r 33/16
U.S. Cl. 324—34
6 Claims

ABSTRACT OF THE DISCLOSURE

An apparatus for measuring magnetic susceptibility of rock formations in the field consisting of an assembly of two coils at right angles, one of the coils being excited by an oscillator and the output of the other being measured, the main characteristic of the assembly being that dimensional variations due to temperature changes or other extraneous factors do not alter the interaction between the two coils; a further characteristic of the assembly being that the offset of one coil to the other may be selected so that small variations in height above the sample will not affect the measurement.

---

This invention relates to an apparatus for measuring the magnetic susceptibility of rock samples in the field. It is desirable to make susceptibility measurements in the field in order to obviate the necessity for transferring rock samples to the laboratory for measurement.

Previously such susceptibility meters have all been of the balanced bridge type. One type, which has found commercial acceptance, consists of three parallel coils, two in one plane and the third in a higher plane. These coils are balanced so that the magnetic field produced by two of them is cancelled by the third. The introduction of magnetically susceptible material into the field alters the mutual inductance and this alteration is measured by a bridge.

This type suffers from the disadvantages that the three coils require accurate alignment and it is therefore in some measure fragile; it also requires adjustment of the bridge null point in free space by mounting the three coils on a tripod before each reading to hopefully eliminate temperature drift.

It is an object of this invention to provide a rigid compact coil structure for determining total susceptibility.

It is a further object of this invention to provide a coil system which is not dependent upon a balanced magnetic field for its operation.

It is yet another object of this invention to provide a structure which will allow magnetic measurements with negligible temperature drift effects.

It is another object of this invention to provide a more portable apparatus than those available and one in which the accuracy of results may be made substantially independent of dimensional variations.

Figure 1:
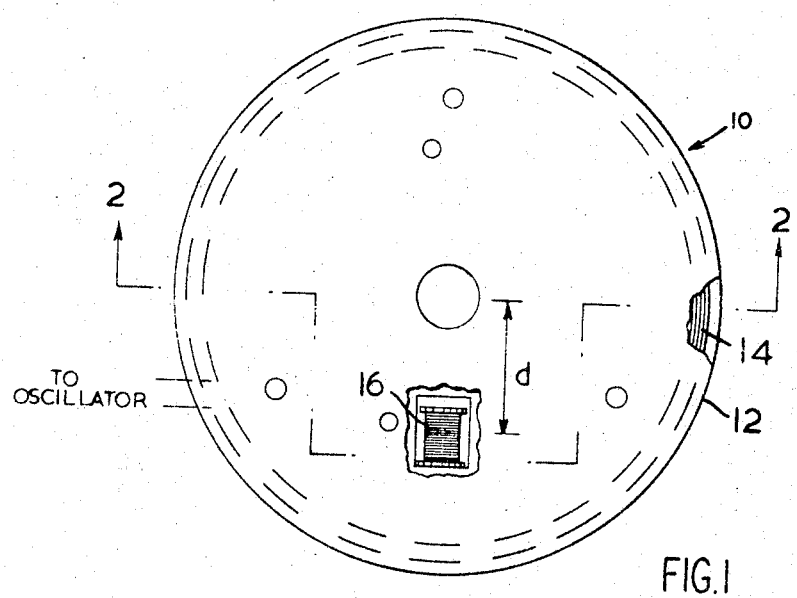
Figure 2:
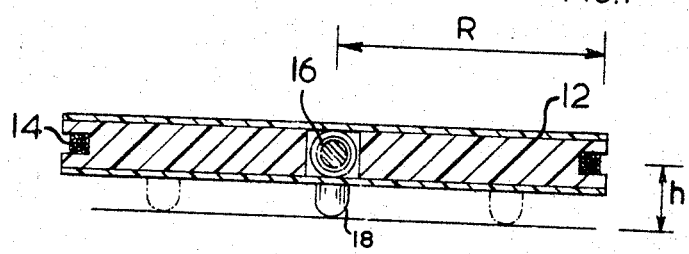
Figure 3:
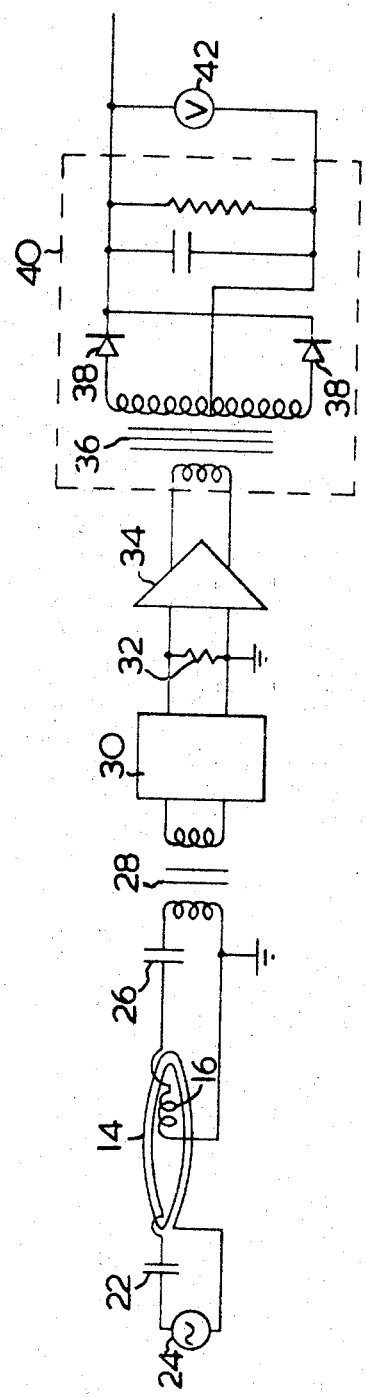
Figure 4:
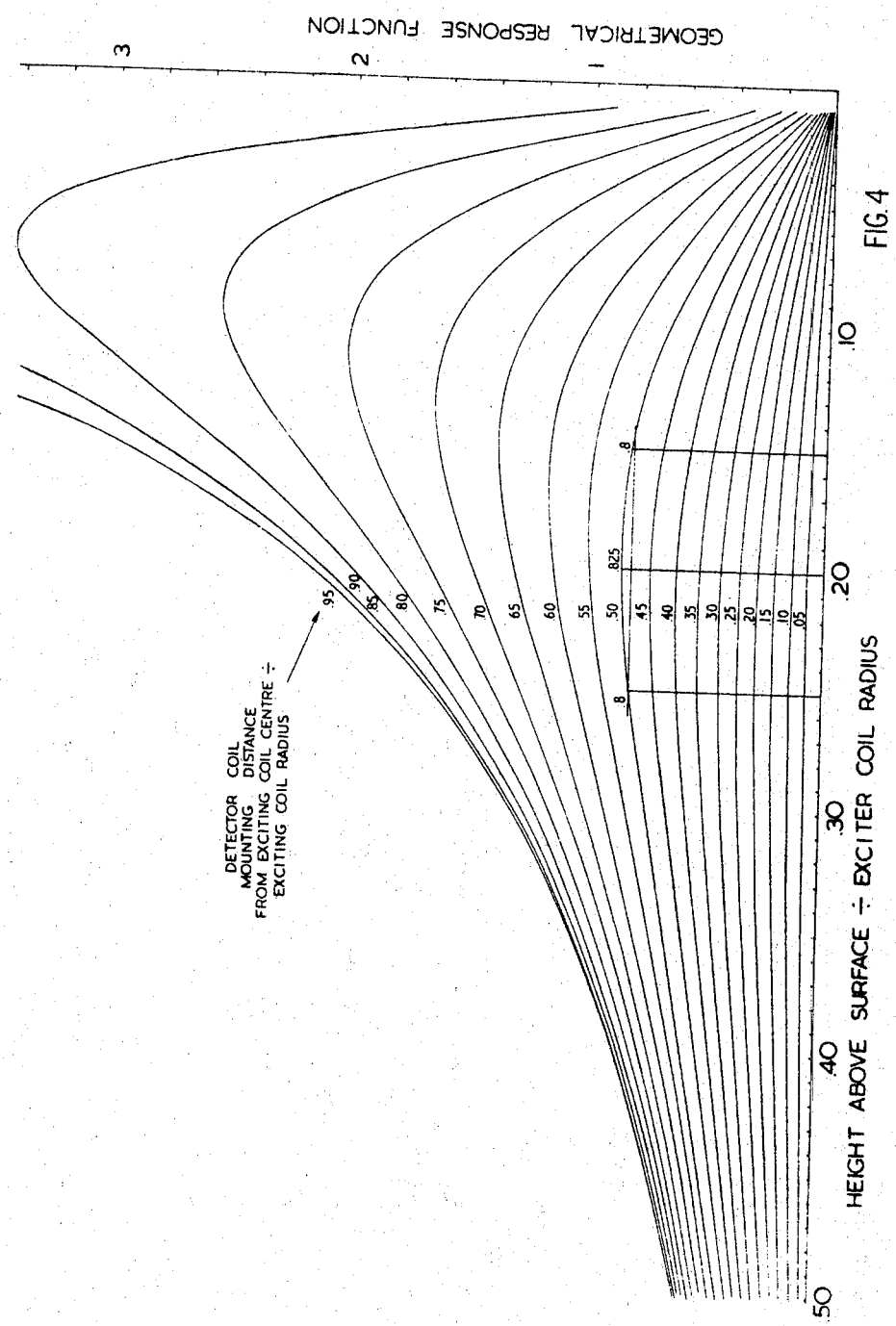

Further objects and advantages of this invention will be apparent on reading the following disclosure and the attached drawings in which:

FIGURE 1 shows a plan view of the two coil systems,
FIGURE 2 shows a vertical section through the line 2—2 on FIGURE 1,
FIGURE 3 shows the circuit used in conjunction with the two coil system of FIGURES 1 and 2, and
FIGURE 4 shows a graph of geometric response function related to height above the surface of the sample to be measured.

It will now be evident that dimensional changes will have no effect upon the relative position of two orthogonal coils; this is in contrast to the parallel coil system where even a temperature change will alter the dimension between the coils to such an extent as to unbalance the system. The consequent adjustment of bridge null point in free space by mounting the coils on a tripod to hopefully eliminate this temperature drift is, therefore, eliminated.

While orthogonal coils are old in the electrical art, they have heretofore been used as detectors of conducting objects and not for taking magnetic measurements. Moreover, the detecting coil is spatially separated many exciting coil diameters from the centre of the exciting coil and one or both coils are moved in operating the device. The "exciting coil" is usually fed by either high power or high frequency which has a direct bearing on the range of detection so that it is more aptly termed a "transmitting coil."

FIGURES 1 and 2 show a preferred embodiment of the apparatus according to the invention. A composite assembly is shown at 10 consisting of a generally planar former of insulating material 12 on which is mounted an exciting coil 14. A detecting coil 16 is mounted within the coil former with its central axis preferably along a radius of the exciting coil. However, it must be understood that the axis of the detecting coil may be somewhat skewed, and that for instance, at 45° to the radial, there will be a useful signal detected.

The detecting coil may, of course, be placed somewhat above or below the exciting coil.

Feet 18 are provided on the exciting coil former 12 so that the plane of the coil is positioned at a height $h$ above the material to be measured for magnetic susceptibility. The mean distance of the detector coil 16 from the centre of the exciting coil 14 is of significance to be shown below and is designated as $d$.

FIGURE 3 shows a typical circuit diagram suitable for the use of the instrument of FIGURES 1 and 2. Exciting coil 14 is tuned by capacitor 22 to a frequency which is not critical. A convenient frequency is 1 kc. which is supplied by a 1 kc. oscillator 24. Similarly, coil 16 is tuned by capacitor 26 and the output is fed through matching transformer 28 through a 1 kc. filter 30 to develop a voltage across resistor 32 for application to the amplifier 34. The output voltage from this amplifier is stepped up by transformer 36 to minimize the nonlinearity of rectifiers 38. The rectified voltage may then be fed to the volt meter 42 or a recording instrument. Many variations of this circuit are possible; it is for instance possible to eliminate tuning the coils if there is an absence of electric noise: other AC generators may be used.

The volt meter may be calibrated to read susceptibility directly in accordance with the formula:

$$V = K\mu_0 n_1 n_2 \times \frac{a_1}{a_2} \times (GRF) \times \frac{I_2}{2\pi} \times \frac{X}{X+2}$$

where K is the amplification factor of the circuit,
$\mu_0$ = permeability of free space $-4\pi \times 10^{-7}$ m.k.s. units,
$n_1$ and $n_2$ are the number of turns of the detector and exciter coils respectively,
$a_1$ and $a_2$ are the area of the detector and exciter coils respectively,
GRF is a constant depending on the relative position of the detector to the exciter coils and the height of the exciter coil plane above the specimen,
$I_2$ is the exciting coil current in amperes, and
X is the susceptibility of the sample.

A particular advantage of this invention will now be shown with reference to FIGURE 4, which shows the geometric response function plotted against the non-dimensional height for various-non-dimensional values of detector coil mounting distances. That is to say, the GRF is plotted against the various values of $h$ (shown on FIGURE 1) divided by R for different values of $d$ divided by R, to make the graph of universal application, R being the exciting coil radius.

An example will show the reason for the preferred embodiment of the detector coil positioning between the centre and periphery of the exciter coil. An exciting coil, say 10" radius, mounted 2" above the surface to be measured will have a GRF of .825 for a detector coil mounting distance of 5". It can be seen that (the exciting coil diameter and detector coil diameter and detector coil mounting radius staying constant) the GRF will only reduce to .800 at a height of less than 1.5" or greater than 2.5". It is clear that height variations or errors of ⅛" will be quite negligible in their effect on susceptibility measurement. Above a value of ⅘ for the non-dimensional detector coil mounting distance, the geometric response function or GRF tends to be sensitive to height variations since the maximum of the curve is abrupt and below ½ the signal strength is sacrificed for level response for variations about a mounting height of no great interest.

Although the invention has been described with reference to examples and drawings, it will be obvious to those skilled in the art that numerous changes in the detail construction and arrangement may be made without departing from the spirit and scope of the invention as hereinafter claimed.

I claim:

1. An apparatus for measuring magnetic susceptibility comprising:
   a substantially planar exciting coil,
   an alternating current generator connected to said exciting coil,
   a detecting coil mounted at a mean distance from the centre of the exciting coil of ont more than ⅘ nor less than ½ of the exciting coil radius, the central axis through said detector coil being orthogonal to the central axis through said exciting coil,
   a steady stable means for maintaining the plane of the exciting coil substantially parallel to and at a predetermined height from an irregular sample surface, and
   a means for measuring the voltage induced in said detecting coil.

2. A magnetic susceptibility measurement meter comprising:
   a substantially planar exciting coil,
   a detecting coil mounted within said exciting coil and offset from the centre thereof so that both ends of said detecting coils are on the same side of the centre of said exciting coil, the central axis of said detecting coil and said exciting coil being orthogonal, and
   a steady stable means for maintaining the plane of the exciting coil substantially parallel to and at a predetermined height from an irregular sample surface.

3. A magnetic susceptibility meter as claimed in claim 2 in which said detector coil is mounted at a mean distance from the centre of said exciting coil of not more than 9/10 nor less than 1/20 of the exciting coil radius.

4. A magnetic susceptibility measurement meter comprising:
   a substantially planar exciting coil,
   an electronic oscillator connected to said exciting coil,
   a detecting coil mounted at a mean distance from the exciting coil centre of not more than 9/10 nor less than 1/20 of the exciting coil radius, the detecting coil length being such that both ends thereof are on the same side of the exciting coil centre, the central axis through said detecting coil and the central axis through said exciting coil being orthogonal,
   a steady stable means for maintaining the plane of the exciting coil substantially parallel to and at a predetermined height from an irregular sample surface, and
   a means for measuring the voltage induced in said detecting coil.

5. A magnetic susceptibility meter as claimed in claim 3 in which said detecting coil is mounted at a mean distance from the exciting coil centre of not more than ⅘ and not less than 1/20 of the exciting coil radius.

6. An apparatus for measuring magnetic susceptibility comprising:
   a substantially planar exciting coil,
   a detecting coil mounted at a mean distance from the centre of the exciting coil of not more than ⅘ nor less than ½ of the exciting coil radius, the central axis through said detector coil being orthogonal to the central axis through said exciting coil, and
   a steady stable means for maintaining the plane of the exciting coil substantially parallel to and at a mean distance from an irregular sample surface.

References Cited

UNITED STATES PATENTS

| | | | |
|---|---|---|---|
| 2,817,060 | 12/1957 | Stateman et al. | 324—37 |
| 2,878,444 | 3/1959 | Feher | 324—34 |
| 2,921,179 | 1/1960 | Anderson | 324—34 |
| 3,061,775 | 10/1962 | Reznowski | 324—41 |

FOREIGN PATENTS

| | | |
|---|---|---|
| 126,548 | 7/1954 | U.S.S.R. |
| 465,338 | 5/1937 | Great Britain. |
| 729,706 | 5/1955 | Great Britain. |

ARCHIE R. BORCHELT, Primary Examiner

R. J. CORCORAN, Assistant Examiner

U.S. Cl. X.R.

324—13